United States Patent
Mendez et al.

(10) Patent No.: US 8,360,029 B2
(45) Date of Patent: Jan. 29, 2013

(54) METHOD FOR IMPROVING VAPORIZATION OF A FUEL FOR AN INTERNAL COMBUSTION ENGINE NOTABLY OF DIRECT INJECTION TYPE, IN PARTICULAR AN AUTOIGNITION ENGINE, AND MORE PARTICULARLY OF DIESEL TYPE

(75) Inventors: Sylvain Mendez, Paris (FR); Bruno Walter, Colombes (FR)

(73) Assignee: IFP, Cedex (FR)

( * ) Notice: Subject to any disclaimer, the term of this patent is extended or adjusted under 35 U.S.C. 154(b) by 69 days.

(21) Appl. No.: 12/496,674

(22) Filed: Jul. 2, 2009

(65) Prior Publication Data
US 2010/0000494 A1    Jan. 7, 2010

(30) Foreign Application Priority Data
Jul. 3, 2008   (FR) ...................... 08 03783

(51) Int. Cl.
 F02B 17/00   (2006.01)
 F02M 43/00   (2006.01)
 F01L 1/34    (2006.01)
(52) U.S. Cl. ...................... 123/295; 123/90.15; 123/304; 60/285
(58) Field of Classification Search .................. 123/294, 123/295, 298–301, 305, 568.14; 60/285, 60/286
See application file for complete search history.

(56) References Cited

U.S. PATENT DOCUMENTS

| | | | |
|---|---|---|---|
| 6,305,364 B1 * | 10/2001 | Ma .......................... | 123/568.14 |
| 6,352,057 B1 * | 3/2002 | Drecq ........................ | 123/66 |
| 6,354,078 B1 * | 3/2002 | Karlsson et al. ................. | 60/274 |
| 6,386,177 B2 * | 5/2002 | Urushihara et al. .......... | 123/299 |
| 6,390,056 B1 * | 5/2002 | Hertzberg et al. ............ | 123/295 |
| 6,499,458 B1 * | 12/2002 | Nieberding .................... | 123/299 |
| 6,637,403 B2 * | 10/2003 | Walter et al. .................. | 123/299 |
| 7,021,277 B2 * | 4/2006 | Kuo et al. ...................... | 123/299 |
| 7,089,912 B2 * | 8/2006 | Koopmans ............... | 123/406.45 |
| 7,143,739 B2 * | 12/2006 | Brachert et al. .............. | 123/295 |
| 7,343,902 B2 * | 3/2008 | Brevick et al. ............... | 123/481 |
| 7,631,489 B2 * | 12/2009 | Liu et al. .......................... | 60/285 |
| 2003/0159441 A1 * | 8/2003 | Kim et al. ....................... | 60/608 |

(Continued)

FOREIGN PATENT DOCUMENTS

| | | |
|---|---|---|
| DE | 103 50 797 A1 | 5/2005 |
| EP | 1 650 421 A1 | 4/2006 |

(Continued)

OTHER PUBLICATIONS

French Search Report 0803783, Feb. 12, 2009.

*Primary Examiner* — John Kwon
*Assistant Examiner* — Johnny Hoang
(74) *Attorney, Agent, or Firm* — Antonelli, Terry, Stout & Kraus, LLP.

(57) ABSTRACT

The present invention relates to a method of improving vaporization of a fuel injecting an engine that can work at least a conventional mode during a high load and an at least partly homogeneous mode with an intake, compression, combustion and exhaust phase during the high load, said engine comprising at least one cylinder, a combustion chamber, at least one intake valve associated with an intake pipe, at least one exhaust valve with an exhaust pipe, control means for controlling opening-closing of the at least one valve and fuel injection means.

14 Claims, 1 Drawing Sheet

U.S. PATENT DOCUMENTS

| | | | |
|---|---|---|---|
| 2003/0172902 A1* | 9/2003 | Gatellier et al. | 123/298 |
| 2005/0000478 A1* | 1/2005 | Kuo et al. | 123/90.15 |
| 2005/0016496 A1* | 1/2005 | Hitomi et al. | 123/305 |
| 2005/0224060 A1* | 10/2005 | Hill et al. | 123/568.21 |
| 2006/0185353 A1* | 8/2006 | Liu et al. | 60/297 |
| 2007/0092426 A1* | 4/2007 | Driscoll et al. | 423/352 |
| 2007/0163535 A1* | 7/2007 | Walter | 123/276 |
| 2008/0173277 A1* | 7/2008 | Otterspeer et al. | 123/295 |
| 2008/0178836 A1* | 7/2008 | Yamashita et al. | 123/295 |
| 2008/0202467 A1* | 8/2008 | Walter et al. | 123/295 |
| 2008/0302319 A1* | 12/2008 | Kang et al. | 123/90.15 |
| 2009/0018747 A1* | 1/2009 | Nitta | 701/102 |
| 2009/0018749 A1* | 1/2009 | Sauer et al. | 701/103 |
| 2009/0282812 A1* | 11/2009 | Hu | 60/285 |

FOREIGN PATENT DOCUMENTS

WO  WO 2006/023098 A2  3/2006

* cited by examiner

METHOD FOR IMPROVING VAPORIZATION OF A FUEL FOR AN INTERNAL COMBUSTION ENGINE NOTABLY OF DIRECT INJECTION TYPE, IN PARTICULAR AN AUTOIGNITION ENGINE, AND MORE PARTICULARLY OF DIESEL TYPE

FIELD OF THE INVENTION

The present invention relates to a method for improving vaporization of a fuel used for an internal-combustion engine, notably of direct injection type, in particular an autoignition engine and more particularly of Diesel type.

In particular, this invention relates to a Diesel type direct-injection engine that can work according to two combustion modes, an at least partly homogeneous mode and/or a conventional mode.

BACKGROUND OF THE INVENTION

The at least partly homogeneous operating mode, preferably used for low and medium engine loads, consists in injecting fuel into the combustion chamber very early (for example during the engine intake phase) so as to obtain essentially homogeneous mixing of the fuel with a fluid such as air or a mixture of air and recirculated exhaust gas (EGR).

For the conventional operating mode, preferably used at high engine loads, a fuel injection is performed around the piston compression top dead centre and a conventional combustion by autoignition, then by diffusion occurs.

During this conventional operating mode, it is also possible to carry out a very early fuel injection, for example at the intake phase start.

In the at least partly homogeneous mode, it is advantageous for the fuel injection to occur very early in the engine running cycle in order to obtain an essentially homogeneous mixture, but there are risks of cylinder wall wetting by the fuel injected, leading to a possible oil film deterioration.

Thus, a fuel injection at the start of the intake phase has the advantage of allowing the fuel injected to be confined in the bowl that the piston of such a Diesel engine is usually equipped with, while limiting contact of this fuel with the cylinder wall. However, the temperature of the fluid contained in the combustion chamber is not sufficient and it is therefore difficult for the fuel injected in this bowl, then in the combustion chamber, to vaporize.

In the conventional operating mode, early injection involves the same drawbacks as regards the injected fuel vaporization difficulties and the risks of cylinder wall wetting as those mentioned above.

This fuel vaporization difficulty can lead to disruptions in the progress of the fuel mixture combustion and to an increase in the discharge of pollutants into the atmosphere, as well as fuel overconsumption.

Better fuel vaporization essentially has the advantage of reducing carbon oxides (CO) and unburnt hydrocarbons (HC) emissions upon combustion of the fuel mixture and the soots.

The present invention aims to overcome the aforementioned drawbacks by means of a method using the elements usually present in a direct-injection engine in order to significantly improve vaporization of the fuel when the engine runs according to the at least partly homogeneous mode or during early injection when the engine runs according to the conventional mode.

SUMMARY OF THE INVENTION

The invention thus relates to a method for improving vaporization of a fuel used for an internal-combustion engine that can run according to a conventional mode and/or according to an at least partly homogeneous mode with an intake, compression, combustion and exhaust phase, said engine comprising at least one cylinder, a combustion chamber, intake means with at least one intake valve associated with an intake pipe, exhaust means with at least one exhaust valve and an exhaust pipe, control means for controlling opening/closing of the valves and fuel injection means, characterized in that it consists:

at the end of the exhaust phase, in carrying out at least one fuel injection into the exhaust pipe so as to produce a mixture with the exhaust gas, at the start of the intake phase, in feeding at least partly the mixture thus formed into the combustion chamber, before the end of the intake phase, in closing the exhaust valve, at the end of the intake phase, in closing the intake valve.

The method can consist in closing the exhaust valve at the end of the exhaust phase and in introducing at least partly the mixture, at the start of the intake phase, during at least one opening/closing sequence of said exhaust valve.

The method can consist, before the end of the intake phase, in feeding into said chamber an intake fluid through the intake pipe and in injecting fuel therein.

The method can consist in carrying out at least one fuel injection in the exhaust pipe during the intake phase.

The method can consist in carrying out at least one fuel injection in the combustion chamber during the intake phase.

The method can consist in carrying out at least one fuel injection in the combustion chamber during the compression phase that follows the intake phase.

The method can consist in carrying out at least one fuel injection in the combustion chamber during the intake phase before the piston reaches the vicinity of the bottom dead centre.

The method can consist in carrying out at least one fuel injection in the combustion chamber before opening of the exhaust valve.

The method can consist in carrying out at least one fuel injection in the combustion chamber after opening of the exhaust valve.

The method can consist in carrying out at least one fuel injection in the combustion chamber after closing of the exhaust valve.

The method can consist in carrying out a succession of exhaust valve opening and closing sequences during the intake phase.

The method can consist, in the vicinity of the start of the engine intake phase, in opening the exhaust valve before the intake valve.

The method can consist, in the vicinity of the start of the engine intake phase, in opening the exhaust valve after the intake valve.

The method can consist, in the vicinity of the start of the engine intake phase, in opening the exhaust valve simultaneously with the intake valve.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
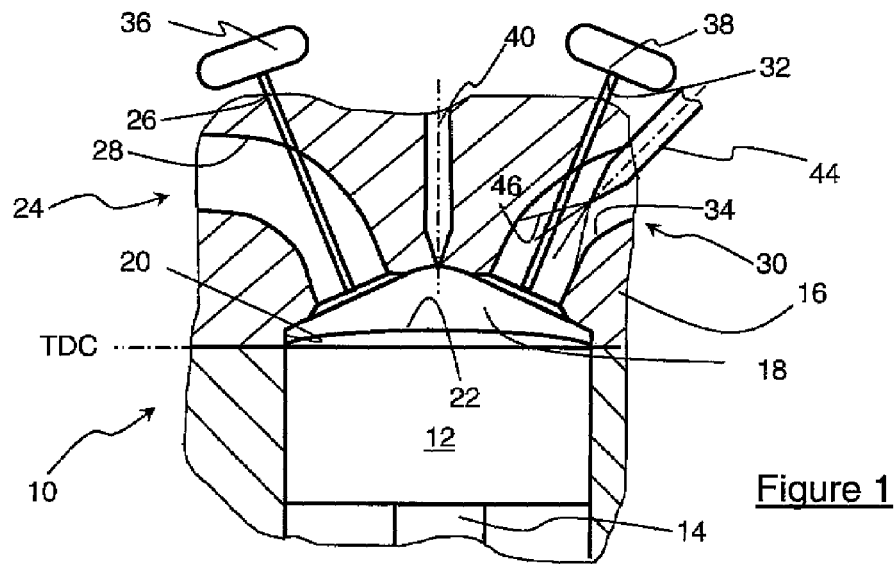
FIGS. 1 to 3 are diagrams of a direct-injection engine illustrating the progress of the various stages of the method according to the invention.
Figure 2:
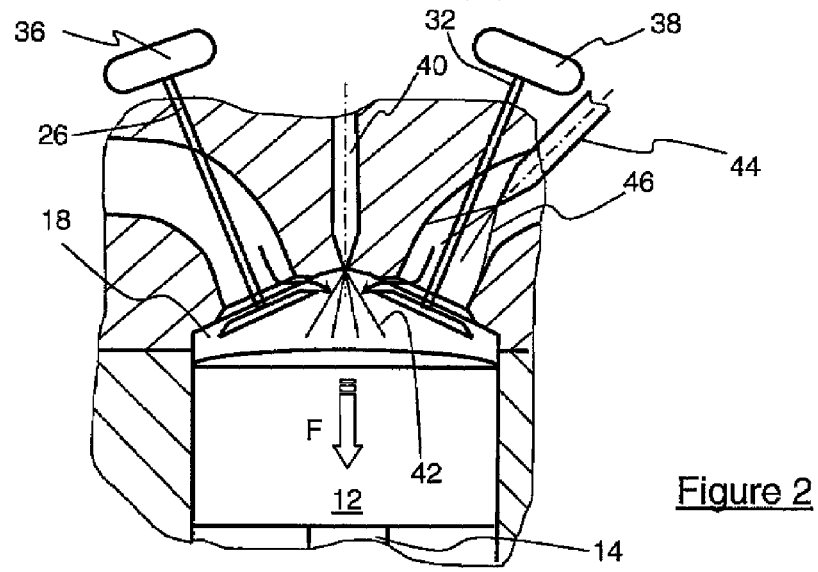
Figure 3:
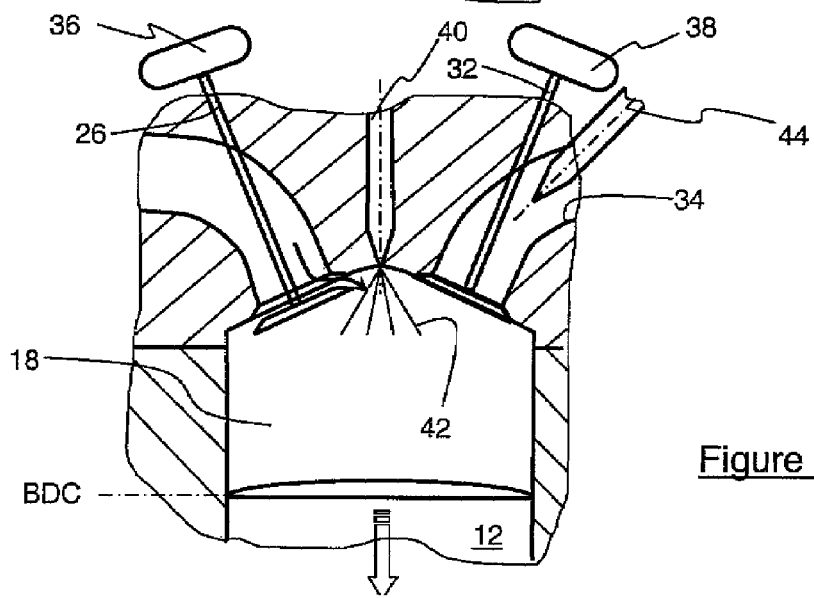

In the example of FIGS. 1 to 3, the internal-combustion engine is a four-stroke (or four-phase) internal-combustion engine with an intake, compression, combustion (or expansion) and exhaust phase. This engine is notably of Diesel direct-injection type and it can run according to two combustion modes, an at least partly homogeneous mode and/or a conventional mode.

This engine comprises at least one cylinder 10 within which a piston 12 slides in a rectilinear reciprocating motion between a top dead centre (TDC) and a bottom dead centre (BDC) under the effect of a rod 14 controlled by a crankshaft (not shown). This cylinder comprises, in the upper part, a cylinder head 16 allowing to delimit a combustion chamber 18 consisting of the lateral wall 20 of cylinder 10, the face of cylinder head 16 and the upper part 22 of the piston.

What is referred to as the combustion chamber is the volume defined above plus the volume made up of a possible concave hollow bowl housed at the top of the piston.

The cylinder head carries intake means 24 with at least one intake valve 26 controlling an intake pipe 28 opening into combustion chamber 18. This cylinder head also carries exhaust means 30 with at least one exhaust valve 32 and an exhaust pipe 34 also communicating with the combustion chamber.

Intake valve 26 is preferably controlled by conventional control means 36 such as a camshaft driven in rotation by the crankshaft through a timing chain or a timing belt (not shown).

Opening/closing of exhaust valve 32 is controlled by control means 38 allowing to perform one or more new opening/closing sequences of this valve. These means can also vary the lift laws of this valve, as regards its opening/closing time as well as its lift, independently of the intake valve. These means are better known as VVA (Variable Valve Actuation), VVT (Variable Valve Timing) or VVL (Variable Valve Lift).

Of course, it is also possible to control the intake valve by means allowing to vary its lift law, as mentioned above.

It is also possible to control this exhaust valve and possibly the intake valve with control means referred to as "camless", i.e. with no camshafts. In this case, the engine comprises actuating means dedicated to each valve, such as an electromagnetic or hydraulic or electrohydraulic or pneumatic or electropneumatic control actuator that directly or indirectly acts upon the valve rod.

In the example described in the description below, opening/closing of intake valve 26 is controlled by a conventional camshaft, whereas exhaust valve 32 is controlled by means allowing to perform at least one new opening/closing sequence of this valve after its conventional opening/closing sequence.

The engine also comprises direct fuel injection means 40, preferably in form of an injection nozzle, which spray fuel into combustion chamber 18 according to a layout with at least one fuel jet 42 (see FIG. 2 or 3).

This engine also comprises indirect fuel injection means 44, preferably in form of an injection nozzle, which spray fuel into exhaust pipe 34 and downstream from exhaust valve 32 with respect to the usual direction of circulation of the exhaust gas from the combustion chamber to this pipe. Advantageously, this fuel injection is achieved with at least one fuel jet 46 so as to obtain a fuel mixture with the exhaust gas contained in this pipe.

Control means 38 of exhaust valve 32, as well as the direct 40 and indirect 44 fuel injection means are controlled by an engine calculator (not shown) which an engine is usually equipped with. Of course, if control means 36 of intake valve 26 are of the type allowing the lift laws of these valves to be varied, the calculator also controls these means.

This calculator contains maps or data tables allowing to operate the engine either according to the at least partly homogeneous mode or according to the conventional mode depending on the parameters it processes.

More particularly, this calculator allows to control the opening/closing sequences of the valves, as well as the fuel injection parameters (injection time during the engine cycle, fuel injection duration, . . . ), either in the exhaust pipe or in the combustion chamber, or in both.

The description of the method hereafter is given in connection with FIGS. 1 to 3.

FIG. 1 shows the configuration of the engine at the end of the exhaust phase of this engine for an at least partly homogeneous mode.

In this configuration, piston 12 is in a position corresponding to its exhaust top dead centre (TDC) and combustion chamber 18 contains hot exhaust gas resulting from the combustion of the fuel mixture during the previous expansion phase of the engine. Intake valve 26 is in the position where it closes intake pipe 28 whereas exhaust valve 32 closes exhaust pipe 34 that therefore contains hot exhaust gas.

From this position and after some crank rotation degrees corresponding to the start of the intake phase of the engine, the calculator controls indirect injection nozzle 44 so that it injects fuel (in one or more stages) into the exhaust gas present in exhaust pipe 34, and the opening of exhaust valve 32.

Of course, this fuel injection and this exhaust valve opening can occur simultaneously or with an interval between them.

The fuel injected rapidly vaporizes in exhaust pipe 34 thanks to the heat of the exhaust gas contained therein, and a mixture of exhaust gas and of vaporized fuel is therefore present in this pipe just downstream from the exhaust valve.

As illustrated in FIG. 2, this intake phase continues with the piston with a stroke, as shown by arrow F, from its TDC to its BDC.

During this phase, intake valve 26 follows an opening/closing sequence under the action of camshaft 36, from the top dead centre of this piston to its bottom dead centre.

During this stroke and considering the opening/closing sequence of the exhaust valve, a mixture of exhaust gas and of vaporized fuel is sucked through exhaust valve 32 and allowed into combustion chamber 18. Similarly, an intake fluid is fed into combustion chamber 18 through intake pipe 28 through the agency of intake valve 26 during its opening/closing sequence.

What is referred to as intake fluid is air at ambient pressure or supercharged air that is compressed by a turbocompressor for example, or a mixture of this air (supercharged or not) with recirculated exhaust gas.

During this intake phase, it is possible to perform a succession of opening/closing sequences of the exhaust valve associated with one or more fuel injections in the exhaust gas contained in the pipe, before the end of the intake phase.

Thus, all or part of the mixture of exhaust gas and of vaporized fuel initially contained in exhaust pipe 32 is fed again into combustion chamber 18 through the exhaust valve without wetting wall 20 of the cylinder.

The calculator can also control, during this intake phase, at least one fuel injection into the combustion chamber by means of direct injection nozzle 40.

This fuel injection in the still hot exhaust gas has the effect of vaporizing this fuel while significantly reducing the contact between the liquid fuel and the cylinder wall.

This direct fuel injection can also continue during this intake phase.

Of course, without departing from the scope of the invention, it is possible to first open the exhaust valve so as to feed again the mixture of exhaust gas and of vaporized fuel into the combustion chamber, then to open the intake valve and finally to inject the fuel into the mixture thus formed while taking advantage of the heat contained in the exhaust gas to vaporize the fuel introduced.

Of course, any other configuration between these two valves can be considered, such as the simultaneous opening thereof at the start of the intake phase.

Similarly, this direct fuel injection can occur simultaneously, before or after feeding into the combustion chamber the mixture of exhaust gas and of vaporized fuel contained in the exhaust pipe.

At the end of this intake phase (FIG. 3), piston 12 is in the vicinity of the bottom dead centre BDC, the injection of fuel into the exhaust pipe is stopped and exhaust valve 32 is in the position where it closes pipe 34 it controls.

The mixture obtained in chamber 18 upon closing of intake valve 26 at the end of the intake phase therefore is an essentially homogeneous fuel mixture containing air, exhaust gas and vaporized fuel.

As it is known, the engine operating mode continues with a fuel mixture compression phase and the possibility of continuing the direct fuel injections and combustion of the fuel mixture.

Alternatively, it is possible not to inject fuel through direct injection nozzle 40 into combustion chamber 18 during the intake phase if the amount of fuel contained in the mixture of exhaust gas and of vaporized fuel reintroduced through the exhaust pipe is sufficient to provide autoignition of the mixture during the combustion phase of this engine.

It is also possible not to inject fuel through direct injection nozzle 40 into the combustion chamber during the intake phase and to carry out this fuel injection operation only during the compression phase so as to obtain an essentially homogeneous mixture at the end of the compression phase and before the combustion phase of the engine.

This allows to vaporize the fuel injected not only thanks to the presence, in the combustion chamber, of the mixture of exhaust gas and of vaporized fuel but also by means of the heat released upon compression of the mixture of air and of exhaust gas and vaporized fuel.

Of course, the person skilled in the art will parametrize the calculator so that it controls closing of the exhaust valve during the intake phase of the engine in such a way that the amount of exhaust gas present in the combustion chamber at the end of this intake phase does not alter the combustion of the fuel mixture.

The present invention is not limited to the embodiment examples described above and it encompasses any variant and equivalent.

The invention claimed is:

1. A method of improving vaporization of a fuel injecting in an internal-combustion engine that can run at least a conventional mode during a high load and an at least partly homogeneous mode with an intake, compression, combustion and exhaust phase during the high load, said engine comprising at least one cylinder, a combustion chamber, intake means with at least one intake valve associated with an intake pipe, exhaust means with at least one exhaust valve and an exhaust pipe, control means for controlling opening-closing of the at least one valve and fuel injection means, said method comprising of:
   at an end of the exhaust phase, injecting at least one fuel injection into exhaust pipe so as produce a mixture of the injected fuel with an exhaust gas;
   at a start of the intake phase, feeding at least partly the mixture of the injected fuel with the exhaust gas thus formed into the combustion chamber;
   before an end of the intake phase, closing exhaust valve; and
   at the end of the intake phase, closing intake valve.

2. A method as claimed in claim 1, wherein comprising: closing exhaust valve at the end of the exhaust phase and introducing at least partly the mixture of the injected fuel with the exhaust gas, at the start of the intake phase, during at least one opening-closing sequence of said exhaust valve.

3. A method as claimed in claim 1, wherein comprising: before the end of the intake phase, feeding into said chamber an intake fluid through intake pipe and injecting fuel therein.

4. A method as claimed in claim 1, wherein comprising: carrying out at least one fuel injection into exhaust pipe during the intake phase.

5. A method as claimed in claim 1, wherein comprising: carrying out at least one fuel injection into combustion chamber during the intake phase.

6. A method as claimed in claim 1, wherein comprising: carrying out at least one fuel injection into the combustion chamber during the compression phase that follows the intake phase.

7. A method as claimed in claim 1, said wherein comprising: carrying out at least one fuel injection into combustion chamber during the intake phase before piston reaches a vicinity of the bottom dead centre.

8. A method as claimed in claim 1, wherein comprising: carrying out at least one fuel injection into the combustion chamber before opening of exhaust valve.

9. A method as claimed in claim 1, wherein comprising: carrying out at least one fuel injection into the combustion chamber after opening of exhaust valve.

10. A method as claimed in claim 1, wherein comprising: carrying out at least one fuel injection into the combustion chamber after closing of exhaust valve.

11. A method as claimed in claim 1, wherein comprising: carrying out a succession of opening and closing sequences of exhaust valve during the intake phase.

12. A method as claimed in claim 1, wherein comprising: in the vicinity of the start of the intake phase of the engine, opening exhaust valve before intake valve.

13. A method as claimed claim 1, wherein comprising: in the vicinity of the start of the intake phase of the engine, opening exhaust valve after intake valve.

14. A method as claimed in claim 1, wherein comprising: in the vicinity of the start of the intake phase of the engine, opening exhaust valve simultaneously with intake valve.

\* \* \* \* \*